(12) United States Patent
Ice et al.

(10) Patent No.: US 6,940,723 B2
(45) Date of Patent: Sep. 6, 2005

(54) HEAT SPREADER FOR OPTICAL TRANSCEIVER COMPONENTS

(75) Inventors: Donald A. Ice, Milpitas, CA (US); Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 239 days.

(21) Appl. No.: 10/615,107

(22) Filed: Jul. 8, 2003

(65) Prior Publication Data

US 2005/0007741 A1 Jan. 13, 2005

(51) Int. Cl.$^7$ ............................................. H05K 7/20
(52) U.S. Cl. ...................... 361/709; 361/704; 361/714; 257/720; 257/707
(58) Field of Search .......................... 361/678, 679–830; 257/707, 706, 712, 713, 720, 722; 385/14, 92, 88, 134, 147; 398/135, 139; 455/575.1, 128, 90.3, 347; 372/36

(56) References Cited

U.S. PATENT DOCUMENTS

| | | | |
|---|---|---|---|
| 3,987,676 A | | 10/1976 | Bennewitz |
| 4,128,697 A | | 12/1978 | Simpson |
| 4,375,578 A | | 3/1983 | Mitchell et al. |
| 4,769,684 A | | 9/1988 | Crocker et al. |
| 5,212,345 A | | 5/1993 | Gutierrez |
| 5,216,730 A | * | 6/1993 | Demeritt et al. ............... 385/33 |
| 5,545,846 A | | 8/1996 | Williams et al. |
| 6,206,582 B1 | * | 3/2001 | Gilliland ...................... 385/92 |
| 6,502,999 B1 | * | 1/2003 | Cohen et al. .................. 385/94 |
| 6,703,561 B1 | * | 3/2004 | Rosenberg et al. ......... 174/52.5 |
| 6,705,769 B2 | * | 3/2004 | Brezina et al. ............... 385/88 |
| 6,707,140 B1 | * | 3/2004 | Nguyen et al. .............. 257/686 |
| 6,756,669 B2 | * | 6/2004 | Houle et al. ................. 257/706 |
| 6,822,875 B2 | * | 11/2004 | Chan et al. .................. 361/760 |
| 6,867,377 B2 | * | 3/2005 | Anderson et al. ........... 174/254 |
| 6,869,230 B2 | * | 3/2005 | Cheng et al. ................. 385/88 |
| 2003/0044121 A1 | * | 3/2003 | Shang .......................... 385/53 |
| 2004/0074661 A1 | * | 4/2004 | Schiaffino et al. ......... 174/52.5 |
| 2005/0045374 A1 | * | 3/2005 | Kumar et al. ............... 174/254 |

FOREIGN PATENT DOCUMENTS

JP         2004063861 A  *  2/2004  ............ H05K/7/20

* cited by examiner

Primary Examiner—Anatoly Vortman
Assistant Examiner—Ingrid Wright
(74) Attorney, Agent, or Firm—Workman Nydegger

(57) ABSTRACT

An optical transceiver module having improved heat dissipation characteristics is disclosed. The transceiver includes a transmitter optical subassembly ("TOSA"), comprising a hermetically sealed housing penetrated by a component platform that includes interior and exterior platform portions. The interior portion of the component platform supports a laser that produces optical signals for emission by the TOSA. A heat tongue is attached to the both the interior and exterior portions of the component platform and is configured to absorb heat that is produced by the laser and absorbed by the component platform. A heat spreader is positioned within the transceiver shell and includes a cavity defined adjacent the heat tongue. A slug is received into the cavity and is positioned to contact both the heat tongue and the heat spreader body. The slug enables heat from the tongue to be transmitted to the heat spreader and eventually to the transceiver shell.

32 Claims, 8 Drawing Sheets

HEAT SPREADER FOR OPTICAL TRANSCEIVER COMPONENTS

BACKGROUND OF THE INVENTION

1. The Field of the Invention

The present invention is generally related to optical transceiver modules employed in optical communications networks. More specifically, the present invention is related to an adjustable optical transceiver design that maximizes thermal dissipation from heat-sensitive transceiver components.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal (containing digital information or other data) from a network device, such as a computer, and converts the electrical signal via a laser to a modulated optical signal. The optical signal can then be transmitted in a fiber optic cable via the optical communications network to a reception node of the network. Upon receipt by the reception node, the optical signal is fed to another optical transceiver that uses a photodetector to convert the optical signal back into electrical signals. The electrical signals are then forwarded to a host device, such as a computer, for processing. The optical transceivers described above have both signal transmission and reception capabilities; thus, the transmitter portion of a transceiver converts an incoming electrical signal into an optical signal, whereas the receiver portion of the transceiver converts an incoming optical signal into an electrical signal.

In addition to the laser and photodetector mentioned above, several other components are also internally included within a typical transceiver module. Among these are a controller, which governs general operation of the transceiver, a laser driver for controlling operation of the laser in the transmitter portion, and a post-amplifier for controlling the photodetector that converts incoming optical signals into electrical signals in the receiver portion.

In a typical transceiver, the components responsible for transmitting and receiving optical signals are located in a transmitting optical sub assembly ("TOSA") and a receiving optical sub assembly ("ROSA"), respectively. Specifically, the laser and associated components for producing an optical signal are located in the TOSA, while the photodetector and related components for receiving an optical signal are located in the ROSA.

Because excessive temperatures can adversely affect the operation of the TOSA and ROSA, it is important to provide adequate means by which heat can be reliably removed from these and similar transceiver assemblies. Specifically, it is desirable to remove heat from within the assembly itself, this heat having been produced by internal assembly components. For example, the laser that is located within the TOSA produces relatively large amounts of heat that, if not removed, can result in malfunction of one or more assembly components.

Unfortunately, many challenges have arisen in attempting to provide adequate heat dissipation from optical transceiver assemblies, such as the TOSA and the ROSA. Many of these challenges center around the difficulty in transferring the heat that is produced inside the TOSA subassembly or ROSA which typically include hermetically sealed housings containing the transmitting or receiving components to heat sinks outside the subassembly. As already mentioned, excess heat buildup within the TOSA, ROSA, or similar housing can result in malfunctioning of the transceiver module and interruption of optical communications.

Of particular concern in the art has been the provision of an adequate heat path from within a TOSA to the outer housing of the transceiver, which serves as a sink for heat generated by the laser and other components located within the TOSA. Because of necessary alignment procedures that are performed on the TOSA during transceiver assembly in order to align its various optical components, a dimensional variability in the optical transceiver is introduced, causing the distance between the TOSA and the outer housing to potentially change according to the desired alignment. Moreover, because the desired alignment of TOSA optical components varies with each optical transceiver that is assembled, the distance between the TOSA and an outer transceiver housing can likewise vary from transceiver to transceiver. This variability substantially prevents the use of stock heat dissipating components, which in turn hinders the ability to establish an adequate heat path between the TOSA and the transceiver housing. Similar problems can also exist with the ROSA and with other transceiver components.

One attempt to overcome the above difficulties has involved custom fitting each optical transceiver with proper sized heat dissipating components. While this approach has been successful at removing heat from the TOSA during transceiver operation, it also represents a significant cost in terms of time and manpower resources to the extent that it becomes cost-prohibitive in practice.

Another approach that has been attempted in overcoming the above difficulties has involved the use of compliant materials to establish a thermal path between the TOSA and the transceiver housing. This approach, however, suffers from the compliant material's lack of adequate heat transfer efficiency, thereby preventing sufficient heat dissipation from the TOSA.

In light of the above discussion, a need currently exists for an optical transceiver that benefits from enhanced heat dissipation characteristics. In particular, there is a need for a system and method by which heat produced within the optical subassemblies of a transceiver can be reliably dissipated, thereby ensuring proper operation of the transceiver.

BRIEF SUMMARY OF THE INVENTION

Briefly summarized, embodiments of the present invention are directed to an optical transceiver module having enhanced heat removal characteristics. These improved characteristics enable the present optical transceiver to adequately dissipate heat from one or more subassemblies located therein. This enhanced heat removal in turn prevents component overheating, thereby ensuring proper operation of the optical transceiver module and its subassemblies.

In accordance with the present invention, a heat spreader for dissipating heat from transceiver components is disclosed. In one embodiment, the heat spreader is interconnected between an outer shell of the optical transceiver and a portion of a transmitting optical subassembly ("TOSA") positioned therein. The TOSA is generally comprised of an outer housing, a nose assembly, and a header assembly. The TOSA header assembly, being securely connected to a rear end of the outer housing, defines a hermetic enclosure that contains various optoelectronic components, including a light-emitting laser for producing optical signals. A component platform hermetically extends through a base of the header assembly to define both an interior platform portion located within the hermetic enclosure on which the laser and other interior optoelectronic components are mounted, and an exterior platform portion on which electrical contacts for the interior components are located. The electrical contacts located on the exterior platform portion are configured to electrically connect with corresponding contacts on a flex circuit or other suitable interface for providing the necessary electrical supply for the various optoelectronic components that are situated on the interior platform portion.

The nose assembly is attached to a front end of the TOSA outer housing and serves not only as an outlet for the passage of optical signals produced by the laser, but as a receptacle to which a connectorized fiber optic cable can attach to receive the optical signals for transmission therethrough.

Presently preferred embodiments of the present invention further include a heat tongue that, like the component platform, also hermetically extends through the rear end of the TOSA housing adjacent the component platform. An interior portion of the heat tongue is positioned within the hermetic enclosure to absorb heat produced by the laser and other optoelectronic components. The heat is conducted to an exterior portion of the heat tongue that is located outside of the hermetic enclosure.

The heat spreader of the present invention is physically and thermally joined to the heat tongue so as to reliably remove heat from the TOSA. Further, the heat spreader is attached to the heat tongue in such a way as to negate any undesirable effects that result from alignment of the TOSA during transceiver manufacture. TOSA alignment occurs when the TOSA outer housing is maneuvered with respect to the nose assembly, which in turn aligns the laser within the header assembly with the nose assembly to maximize the quality of the optical signal that is emitted from the transceiver. As a result of this alignment, however, a variation in distance between the heat tongue (which is indirectly attached to TOSA outer housing) and the shell of the optical transceiver that houses the TOSA is introduced. Because the final outer housing/nose assembly alignment configuration can vary from transceiver to transceiver, the distance from heat tongue to transceiver shell also varies with each transceiver.

The present invention resolves any difficulty created by the above alignment procedure with the use of a thermal slug that is incorporated into the heat spreader. In particular, the heat spreader, which is comprised of a thermally conductive material such as copper, is joined to the heat tongue via the thermal slug, which is received within a cavity defined in the heat spreader. The thermal slug is in turn attached to the heat tongue by way of an adhesive, solder, or other means. The thermal slug can reside in a variety of vertical positions within the cavity of the heat spreader, thereby acting as a positional intermediary between the heat spreader and the heat tongue, both of which have fixed positions after TOSA alignment. Once affixed between the heat tongue and the heat spreader, the thermal slug enables heat transferred to the heat tongue from inside the TOSA to be conducted to the heat spreader. The heat spreader, in turn transmits this heat to the optical transceiver shell, which acts as a heat sink for the optical transceiver. Thus, internal TOSA heat is removed via the heat tongue and heat spreader to the transceiver shell, according to presently preferred embodiments. This ensures that internal TOSA components such as the laser are protected from excessive heat and its consequential damage, thereby helping to ensure proper transceiver operation.

In addition to the TOSA, other heat producing assemblies within an optical transceiver, such as a receiver optical subassembly ("ROSA"), can also benefit from the principles taught by the present invention.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–8 depict various features of embodiments of the present invention, which is generally directed to a heat spreading device for assisting the dissipation of heat within an optical transceiver module that is used in optical communications networks. In particular, a heat spreader is disclosed for efficiently removing heat from within a transmitter optical subassembly that comprises part of the transceiver module. The heat removal made possible by the present invention prevents damaging heat buildup from occurring within the transmitter optical subassembly, thereby ensuring improved operating characteristics for the transceiver module.

Figure 6:
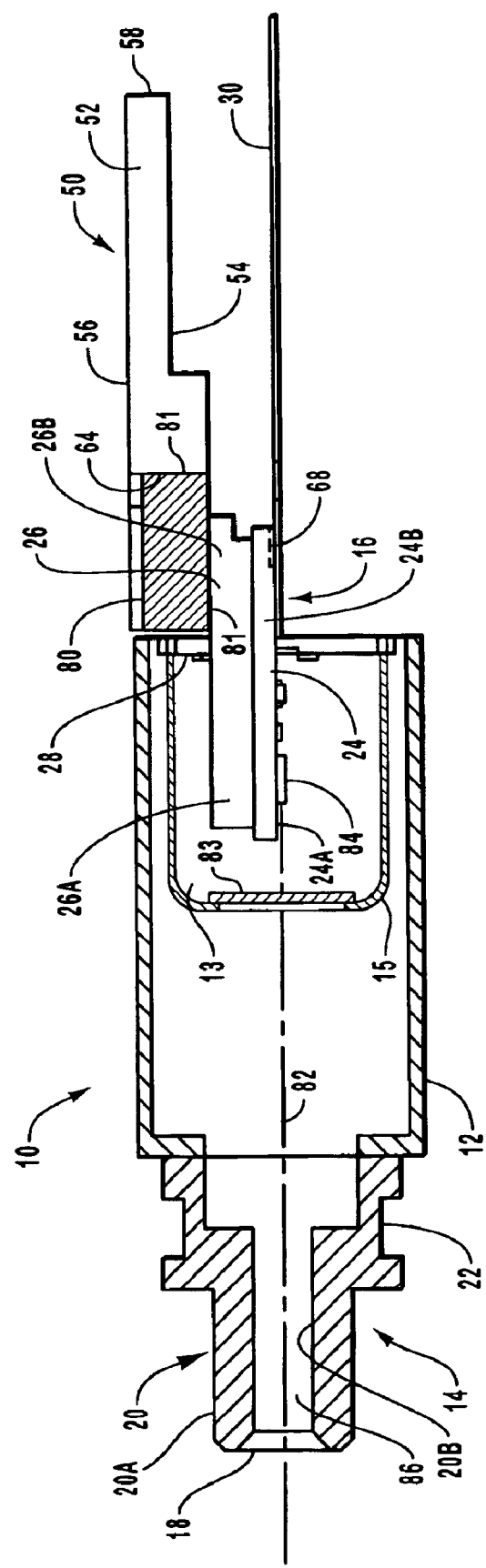
FIG. 6 is a partial cross sectional side view of the TOSA and heat spreader taken along the line 6—6 in FIG. 5, showing the position of the thermal slug therein.
Figure 7:
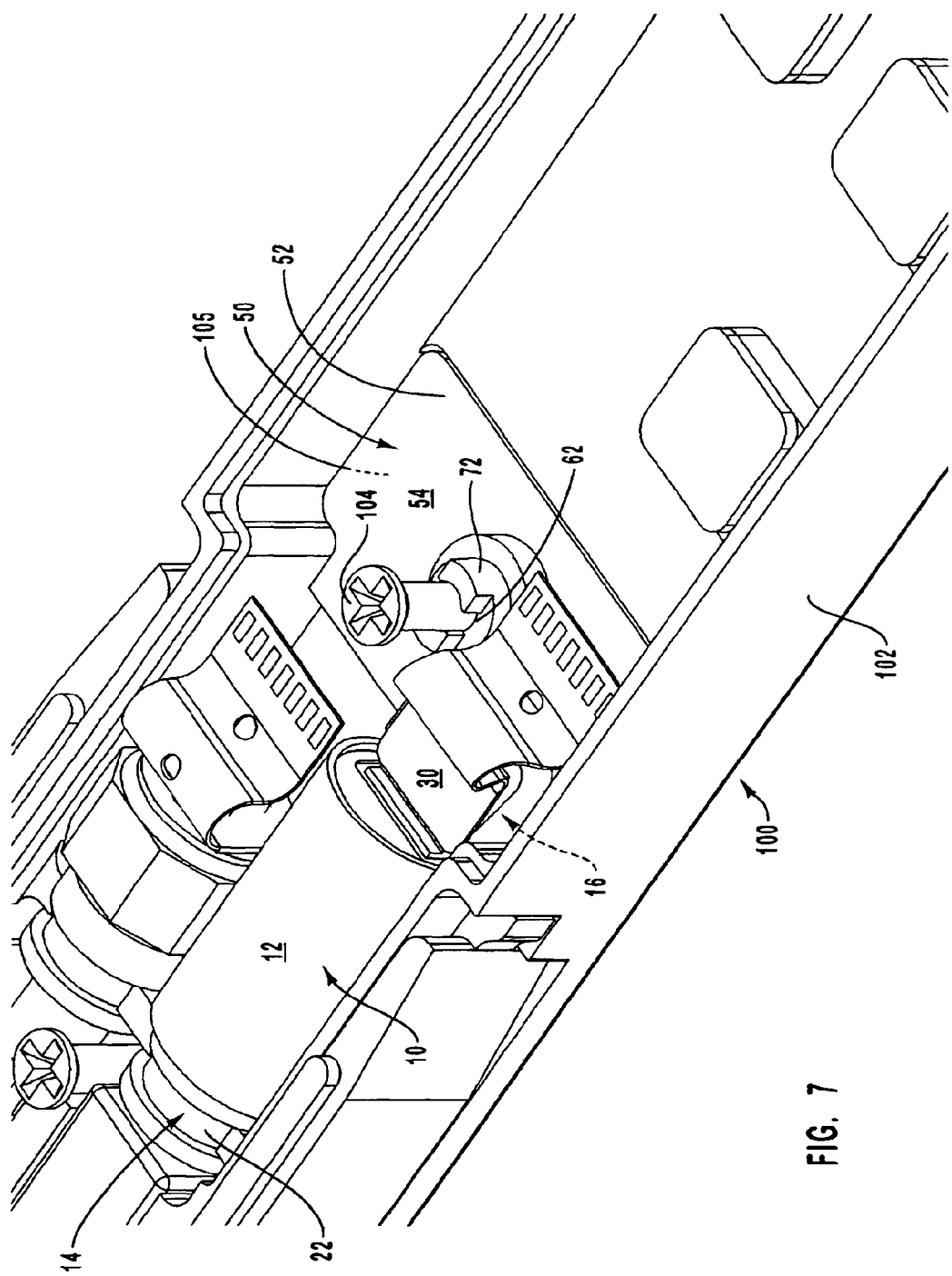
FIG. 7 is a bottom perspective view of a portion of an optical transceiver module having a TOSA and a heat spreader seated therein in accordance with one embodiment of the present invention.
Figure 8:
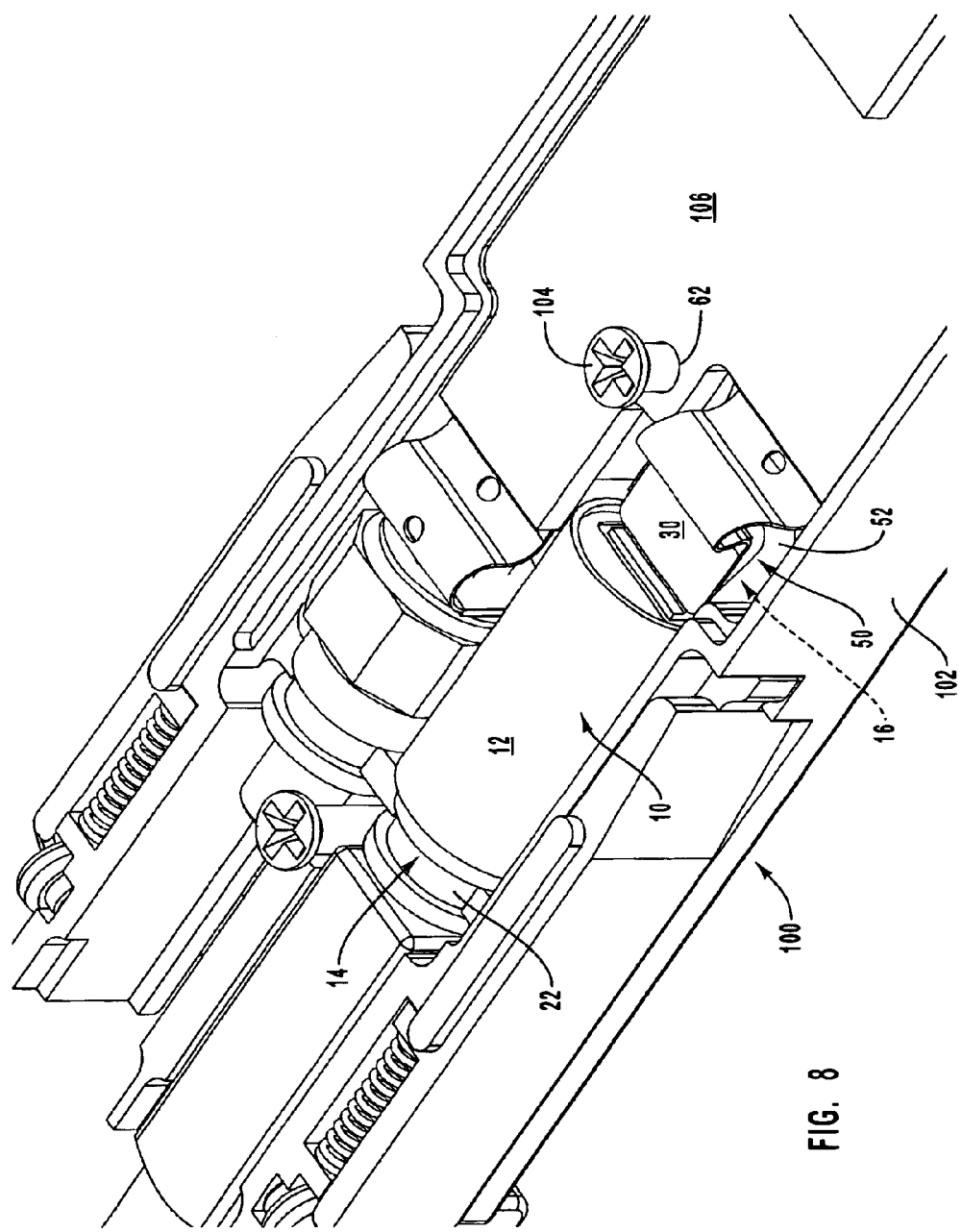
FIG. 8 is a bottom perspective of the optical transceiver module of FIG. 7, showing a printed circuit board disposed adjacent the heat spreader.

Reference is first made to FIG. 1A, which shows various features of a transmitter optical subassembly ("TOSA"), generally shown at 10, comprising one internal component of an optical transceiver module (see FIGS. 7 and 8). As shown, the TOSA 10 generally includes a housing 12, a nose assembly 14, and a header assembly 16. The TOSA housing 12 can contain a hermetically sealed enclosure 13 (see FIG. 6) that houses various components that are used in producing an optical signal for transmission via an optical communications network. Among these components is included a laser (see FIG. 6) that produces an optical signal that can be modulated to represent digital data that originates as electrical signals from a host device (not shown) connected to the transceiver module. In the illustrated embodiment, the TOSA housing 12 comprises a cylindrical enclosure having a size and shape configured for its disposal within the optical transceiver module.

The nose assembly 14 is affixed to one end of the TOSA housing 12 and provides an outlet for optical signals that are produced within the TOSA housing 12. Specifically, an aperture is defined in the end of the TOSA housing 12 and communicates with an optical path defined through the nose assembly 14 (FIG. 6) such that optical signals produced within the housing are transmitted through the nose assembly to exit an end 18 thereof. A connector portion 20 is formed at the end 18 for connecting the nose assembly 14 with a fiber optic cable (not shown) that in turn connects to a communications network. So arranged, the optical signals that are produced within the TOSA housing 12 and transmitted through the nose assembly 14 can then pass into the fiber optic cable connected at the connector portion 20 for transmission via the communications network. The nose assembly 14 can further include an alignment feature, such as an annular groove 22, for aligning the TOSA 10 within the optical transceiver module.

The header assembly 16 is located at an opposite end of the TOSA housing 12 from the nose assembly 14. As shown, the header assembly 16 comprises various components, including a component platform 24, heat tongue 26, a header portion 28, and a cap 15 (FIG. 6). The component platform 24 preferably comprises a rectangular slab of ceramic material that penetrates through the header portion 28. The header portion 28, comprising a substantially circular, flattened plate, forms a base for the header assembly 16 and defines, along with the cap 15, the hermetic enclosure 13 (FIG. 6). The component platform 24 bisects and is hermetically sealed to the header portion 28. In this arrangement, the component platform 24 includes an interior segment 24A located within the hermetic enclosure 13, and an exterior segment 24B extending from the header portion 28 on the exterior of the TOSA housing 12 (FIG. 6). The interior segment 24A is suitable for receiving on its surface a plurality of electrical and electronic components, such as a laser (FIG. 6) for producing an optical signal, as described above. At least one conductive pathway can be defined through the component platform 24 to electrically connect the components on the interior segment 24A with electrical contact pads (see FIG. 3) on the exterior segment 24B in order to provide electrical signals to the components as needed. Further details concerning the header assembly 16 in general, and the component platform 24 in particular, can be found in U.S. application Ser. No. 10/077,067, entitled "Ceramic Header Assembly," filed Feb. 14, 2002, and U.S. application Ser. No. 10/231,395, entitled "Header Assembly Having Integrated Cooling Device," filed Aug. 29, 2002, which are incorporated herein by reference in their entireties.

FIG. 1A further depicts various details regarding the heat tongue 26. Like the component platform 24, the heat tongue 26 hermetically penetrates the header portion 28 of the TOSA housing 12 to define an interior portion 26A and an exterior portion 26B (see FIG. 6). As shown, the heat tongue 26 physically attaches to the component platform 24. Specifically, the interior portion 26A of the heat tongue 26 attaches to a portion of the interior segment 24A of the component platform 24, while the exterior portion 26B attaches to a portion of the exterior segment 24B of the component platform. In this configuration, then, the interior portion 26A of the heat tongue 26, like the component platform interior segment 24A, is contained in the hermetic enclosure 13 (FIG. 6). The physical attachment of the heat tongue 26 with the component platform 24 further provides thermal communication between the two such that heat produced by the electronic components on the interior segment 24A of the component platform can be transmitted from the platform the interior portion 26A of the heat tongue. The heat is then transferred to the exterior portion 26B of the heat tongue 26 to be dissipated, as will be explained.

The heat tongue 26 is preferably composed of a suitable, thermally conductive material. In one embodiment, the heat tongue 26 is composed of a copper tungsten alloy, which affords the heat tongue thermal conductivity as well as a coefficient of thermal expansion that is similar to that of the ceramic from which the component platform 24 is preferably formed. Note that other materials can alternatively be used for both the component platform 24 and the heat tongue 26, as appreciated by those skilled in the art. As will be seen, the heat tongue 26 cooperates with the heat spreading device of the present invention to dissipate heat produced in the TOSA housing 12.

FIG. 1A also shows a flex circuit 30 that is affixed to a portion of the exterior segment 24B of the component platform 24. The flex circuit 30 includes conductive vias and contact points at one end that are configured to electrically connect with the electrical contact points (see FIG. 3) that are located on the exterior segment 24B in order to provide electrical signals to the electronic components located on the interior segment 24A of the component platform 24. Another end of the flex circuit electrically connects to a transceiver printed circuit board (see FIG. 8) via the conductive vias, thereby providing electrical connection between the component platform 24 and components located on the transceiver printed circuit board.

Reference is now made to FIG. 1B, which shows an end view of the TOSA 10. In particular, FIG. 1B depicts various details of the nose assembly 14, including the connector portion 20, the end 18 of the nose assembly, and a passage 86 defined through the nose assembly. The passage 86 participates in defining a desired optical path 82 (see FIG. 6) through the TOSA 10 along which optical signals produced by a laser disposed on interior segment 24A of the component platform 24 and the optical path are transmitted.

In greater detail, the connector portion 20 includes exterior surface 20A and interior surface 20B. Interior surface 20B defines a portion of the passage 86 of the nose assembly 14 and is precision bored to allow passage of the optical signal produced by the laser (FIG. 6). The exterior and interior surfaces 20A and 20B cooperate to define a receptacle that is configured to receive a connectorized fiber optic cable (not shown) for attachment to the nose assembly 14. So attached, the fiber optic cable is capable of receiving and transmitting the optical signals produced by the TOSA 10. Note that the connector portion 20 can vary in structure or design from that described here while not departing from the claims of the present invention.

During manufacture of the transceiver, it is typically necessary to perform an optical path alignment operation, wherein the nose assembly 14 of the TOSA 10 is maneuvered with respect to the housing 12 such that optical coupling between the housing and the passage 86 of the nose assembly is maximized. This operation is carried out by placing the housing 12, which has had the header assembly 16 previously joined to it in a press fit operation, into a jig or other appropriate securing device. The nose assembly 14 is then brought into a position proximate the respective end of the housing 12. Using an active alignment process, the nose assembly 14 is maneuvered in an imaginary plane that is perpendicular the longitudinal axis of the TOSA 10 until maximum optical coupling of the laser-produced optical signal is achieved between the nose assembly passage 86 and the housing 12. Once maximum coupling is achieved, the nose assembly 14 is secured in place and attached to the housing 12 by laser welding, or other appropriate means. Of course, other alignment processes can be followed to achieve the same result. Thus, proper alignment of the nose assembly 14 with respect to the housing 12 results in an optimum level of light transmission from the laser through the nose assembly, which correspondingly leads to optimum optical signal emission from the TOSA 10 for transport via a fiber optic cable attached to the connector portion 20 thereof.

FIG. 1B further illustrates the possible range of movement of the nose assembly 14 with respect to the TOSA housing 12 during the alignment operation just discussed. As mentioned, during alignment the nose assembly 14 is not yet fixed to the respective end of the TOSA housing 12, thereby enabling it to be maneuvered with respect to the housing end. This movement of the nose assembly 14 occurs in an imaginary plane perpendicular to the longitudinal axis of the TOSA 10. In one embodiment, the nose assembly 14 is sized and configured to allow movement of the nose assembly approximately 0.01 inch in any direction along the imaginary plane from a nominal center position, indicated by the intersection of arrows 32 in FIG. 1B. This range of motion of the nose assembly 14 enables optimum positioning thereof with respect to the housing 12 generally, and to the laser (see FIG. 6) specifically, as explained above. It should be noted that the specific descriptions given herein regarding the TOSA 10 and nose assembly 14 are not meant to be limiting to the present invention. Indeed, the TOSA and nose assembly can assume varying configurations as appreciated by one skilled in the art while still being able to benefit from the present invention to be described herein.

Figure 1:
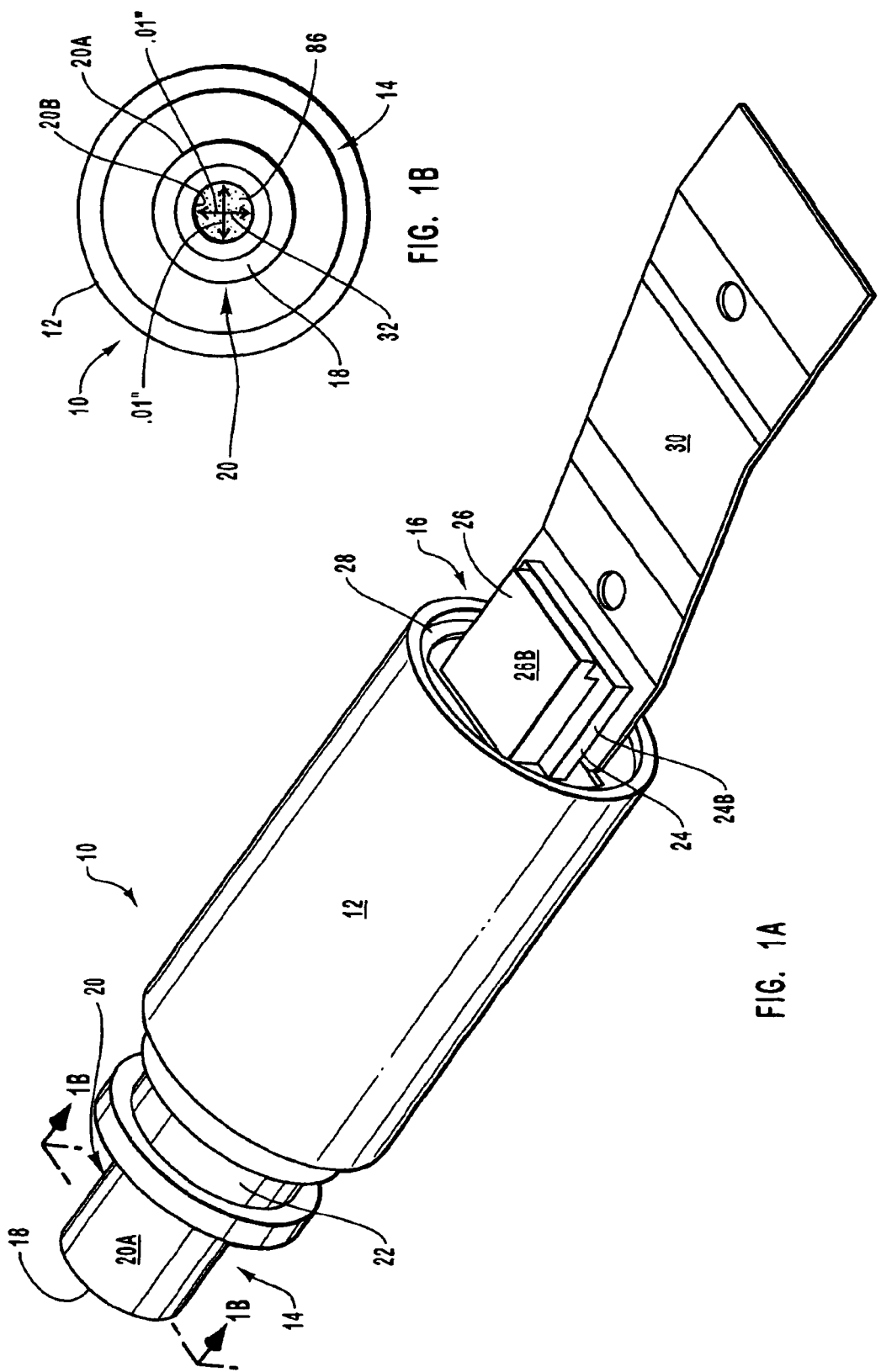
FIG. 1A is a perspective view of a transmitter optical subassembly ("TOSA") that incorporates one embodiment of the present invention.
FIG. 1B is an end view of the TOSA of FIG. 1, taken along the line 1B—1B.
Figure 2:
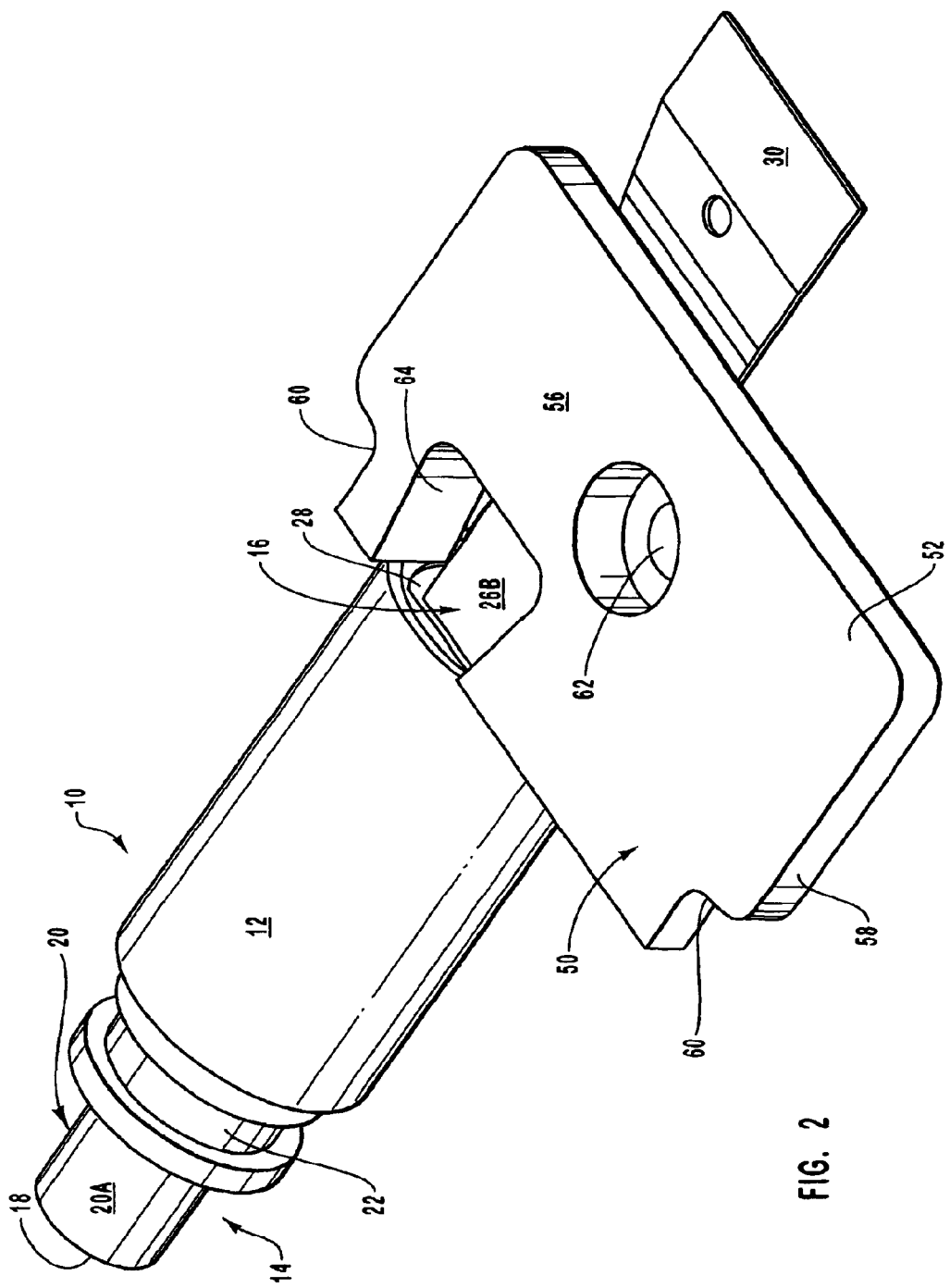
FIG. 2 is a top perspective view of the TOSA of FIG. 1, also showing a heat spreader positioned therewith, in accordance with one embodiment of the present invention.

Reference is now made to FIG. 2, which illustrates the TOSA 10 of FIG. 1 and one presently preferred embodiment of the present invention disposed therewith. Specifically, a heat spreader, generally designated at 50, is shown positioned in close proximity to the TOSA 10. As already mentioned, the heat spreader 50 is configured to assist in the dissipation of heat produced by electronic components that are positioned within the TOSA housing 12. FIG. 2 shows a top view of the heat spreader 50, which in the present embodiment generally comprises a substantially planar body 52 composed of a heat conductive material, such as copper. The body 52 includes a bottom surface 54 (FIG. 3) and a top surface 56. The thickness of the body 52 can vary according to need, but is generally thick enough to facilitate a thermal connection between the header assembly 16 and the shell of the optical transceiver (see FIG. 7), as will be seen. An outer periphery 58 defines the particular shape of the body 52, including two notches 60. An aperture 62 is formed through the body in the illustrated embodiment to receive a fastener, such as a screw, for securing the heat spreader to the housing of the optical transceiver. Note that the particular shape of the heat spreader body can be modified in accordance with the needs of a particular application.

A specifically shaped cavity 64 is also formed in the heat spreader body 52. The cavity 64 is sized and configured to receive a correspondingly shaped thermal slug (see FIG. 4). Here, the cavity 64 is trapezoidally shaped. Though other cavity shapes are possible, the trapezoidal shape of the cavity 64 as shown here offers several advantages with respect to operation of the present invention, as will be discussed further below.

The position of the cavity 64 is such that it resides substantially adjacent the heat tongue 26 of the header assembly 16 after the header assembly is aligned and affixed to the end of the TOSA housing 12. In FIG. 2, the cavity 64 is formed along a portion of the outer periphery 58 that is proximate the end of the TOSA housing 12. In this way, the thermal slug can be positioned such that it interconnects the heat spreader 50 and the heat tongue 26 to establish a thermal path between the header assembly 16 and the housing of the optical transceiver in order to dissipate heat from internal TOSA components, as will be described in further detail below. Though shown here as completely extending through the body 52, the cavity 64 can alternatively form a depression that does not completely extend through the body.

Figure 3:
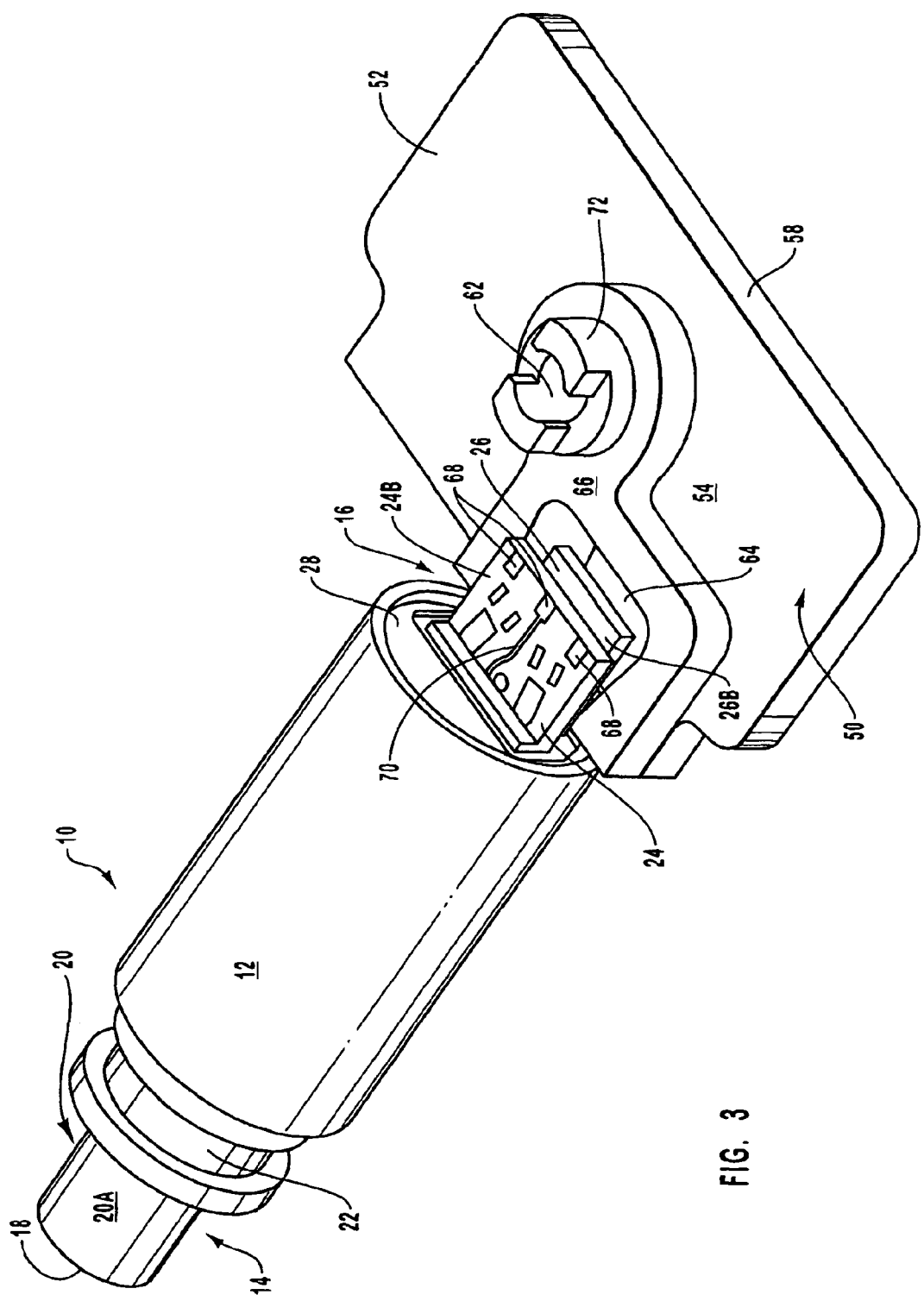
FIG. 3 is a bottom perspective view of the TOSA and heat spreader shown in FIG. 2.

Reference is now made to FIG. 3, which illustrates a bottom perspective view showing various details regarding the TOSA 10 and the heat spreader 50. FIG. 3 affords a view of various features of one surface of the exterior segment 24B of the component platform 24, including a plurality of contact pads 68. The contact pads 68 are electrically connected with electronic components located on the interior segment 24A by way of conductive vias, one of which is shown at 70. The contact pads 68 in turn electrically connect with contact pads located on the flex circuit 30 shown in FIG. 1A to enable electrical communication between a transceiver printed circuit board (FIG. 8) and the internal TOSA components, such as a laser. A portion of the heat tongue 26 is also seen adjacent the component platform 24 in FIG. 3.

FIG. 3 shows various details of the bottom surface 54 of the heat spreader body 52 according to one presently preferred embodiment. In addition to the features already discussed, namely, the body periphery 58, aperture 62, and cavity 64, additional features of the heat spreader 50 are also shown. The body 52 includes a raised portion 66 that is formed about both the aperture 62 and the cavity 64. The raised portion 66 is used in the present embodiment to facilitate an adjacent connection between the thermal slug (FIG. 4) and the heat tongue 26.

The raised portion 66 further defines a screw boss 72 about the aperture 62 on the bottom surface 54. The raised surfaces of the screw boss are configured to maintain a specified spacing between the heat spreader 50 and the transceiver printed circuit board (FIG. 8) when these components are positioned within the housing of an optical transceiver module, as will be discussed. It is appreciated that the heat spreader of the present invention can include additional or alternative physical features than those specifically discussed here in order to suit a particular application.

FIG. 3 illustrates the proximity that exists between the exterior portion 26B of the heat tongue 26 and the cavity 64. This proximity is such that the thermal slug (FIG. 4) can create a thermal path between the heat tongue 26 and the heat spreader 50, as will be discussed.

Figure 4:
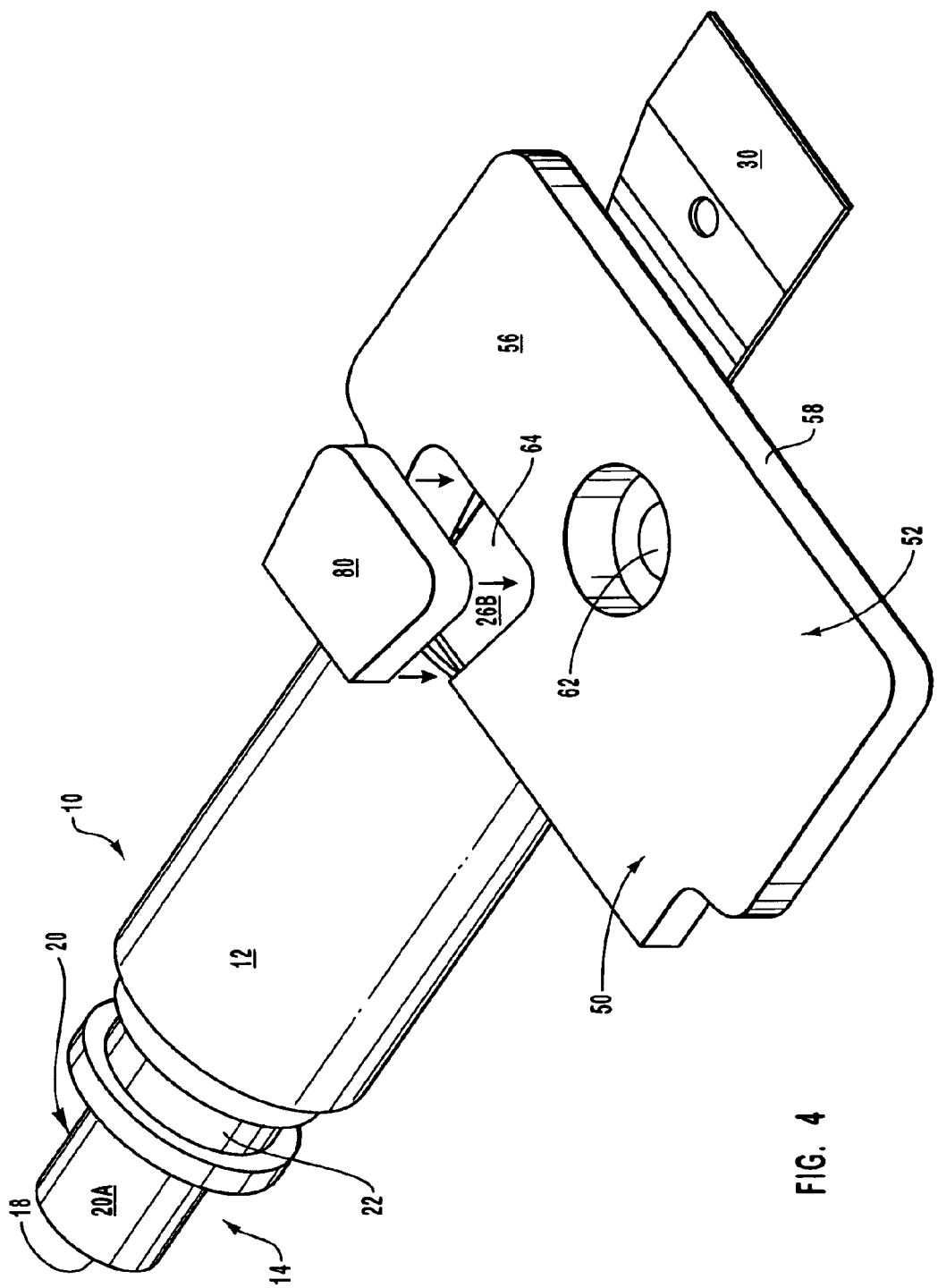
FIG. 4 is a top perspective view of the TOSA and heat spreader of FIG. 2, further illustrating the placement of a thermal slug in the heat spreader, in accordance with one embodiment of the present invention.

Reference is now made to FIG. 4. In accordance with embodiments of the present invention, an apparatus is disclosed herein for assisting in the removal of heat from within the TOSA 10. As has been discussed, the heat spreader 50 represents one such apparatus. The heat spreader 50 includes a thermal slug 80 that is sized and configured to be received in the cavity 64 defined through the body 52 of the heat spreader. The thermal slug 80 possesses a shape corresponding to the shape of the cavity 64 which, as stated previously, is trapezoidal in the illustrated embodiment, though this shape is not meant to be limiting of the present invention. Though it can have one of a variety of thicknesses, in the present embodiment, the thermal slug 80 as illustrated has a thickness approximately less than the thickness of the heat spreader body 52 about the cavity 64. However, in other embodiments, the thermal slug 80 can alternatively have a thickness equal to or even greater than that of the heat spreader body 52.

As it is intended to transfer heat from the header assembly 16 to the heat spreader 50, the thermal slug 80 is composed of a thermally conductive material. Moreover, as it is designed to closely match the size of the cavity 64, the thermal slug 80 should be made from a material having a coefficient of thermal expansion that is similar to the material from which the body 52 of the heat spreader 50 is composed. In presently preferred embodiments, both the body 52 and the thermal slug 80 are comprised of copper. Finally, a close tolerance preferably exists between the interfacing surfaces of the body 52 defining the cavity 64 and the thermal slug 80 such that minimum spacing exists between the body and slug when the slug is seated within the cavity. This ensures sufficient heat conductivity between the thermal slug 80 and the heat spreader body 52 when the two are joined, as explained below.

As mentioned, the shape of the thermal slug 80 corresponds to the shape of the cavity 64 of the heat spreader body 52. In the present embodiment, both the thermal slug 80 and the cavity 64 are trapezoidally shaped. This shape affords several advantages to be realized in connection with the function of the present invention. First, the trapezoidal shape ensures the thermal slug 80 is positioned within the cavity 64 in a predetermined orientation. Second, the trapezoidally shaped cavity 64 limits movement of the thermal slug 80 when it is positioned within the cavity before being affixed to the heat spreader body 52 during TOSA manufacture. Third, the trapezoidal shape of the thermal slug 80 helps to minimize any gaps between its outer periphery and the surface of the heat spreader body 52 that defines the cavity 64, thereby ensuring greater heat transfer between the two during transceiver operation. Notwithstanding the advantages derived by the shaped cavity 64 and thermal slug 80 as discussed herein, it is appreciated that other shape configurations can also be employed that satisfy all, some, or none of the above advantages, but that nonetheless satisfy the functionality of the present invention.

The body 52 of the heat spreader 50 in the illustrated embodiment does not directly contact the header assembly 16. Instead, contact between these components is achieved via the thermal slug 80. Because of the alignment procedures that are performed on the TOSA 10 as described above in connection with FIG. 1B, a variability in distance can exist between the heat tongue 26 and the heat spreader body 52 (that is affixed to a portion of the optical transceiver shell). The distance between these components varies from transceiver module to transceiver module due to the unique alignment requirements of each transceiver.

The present heat spreader 50 is designed to overcome any problems relating to the distance variability spoken of above. In particular, the thermal slug 80 is configured to ensure sufficient thermal communication between the heat tongue 26 and the heat spreader body 52 regardless of the particular alignment position of the heat tongue as part of the header assembly 16 (as in FIG. 1B). As shown in FIG. 4 the thermal slug 80, during transceiver manufacture, is placed within the cavity 64 of the heat spreader body 52. As will be seen below, the depth to which the thermal slug 80 descends into the cavity 64 is determined by the particular alignment position of the TOSA housing 12 with respect to the nose assembly 14, which indirectly affects the alignment position of the heat tongue 26 of the header assembly 16 with respect to the heat spreader 50, as has been explained.

Once the thermal slug 80 is properly positioned within the cavity 64, it is affixed to both the heat tongue 26 and the body 52 defining the cavity, preferably at the bonding areas shown at 81 in FIG. 6. Preferably, the bonding means comprises a thermally conductive material, such as a silver epoxy or a solder, so that it does not inhibit the flow of heat between the heat tongue 26, the thermal slug 80, and the heat spreader body 52. Generally speaking, a bonding means having a relatively high thermal conductivity is preferred over a less thermally conductive bonding means. Note that alignment of the nose assembly 14 with the housing 12, which in turn determines the final position of the header assembly 16, occurs before the thermal slug 80 is affixed within the cavity 64 in order to ensure that the thermal slug seats against the heat tongue 26 of the header assembly 16 in its final, aligned position.

Figure 5:
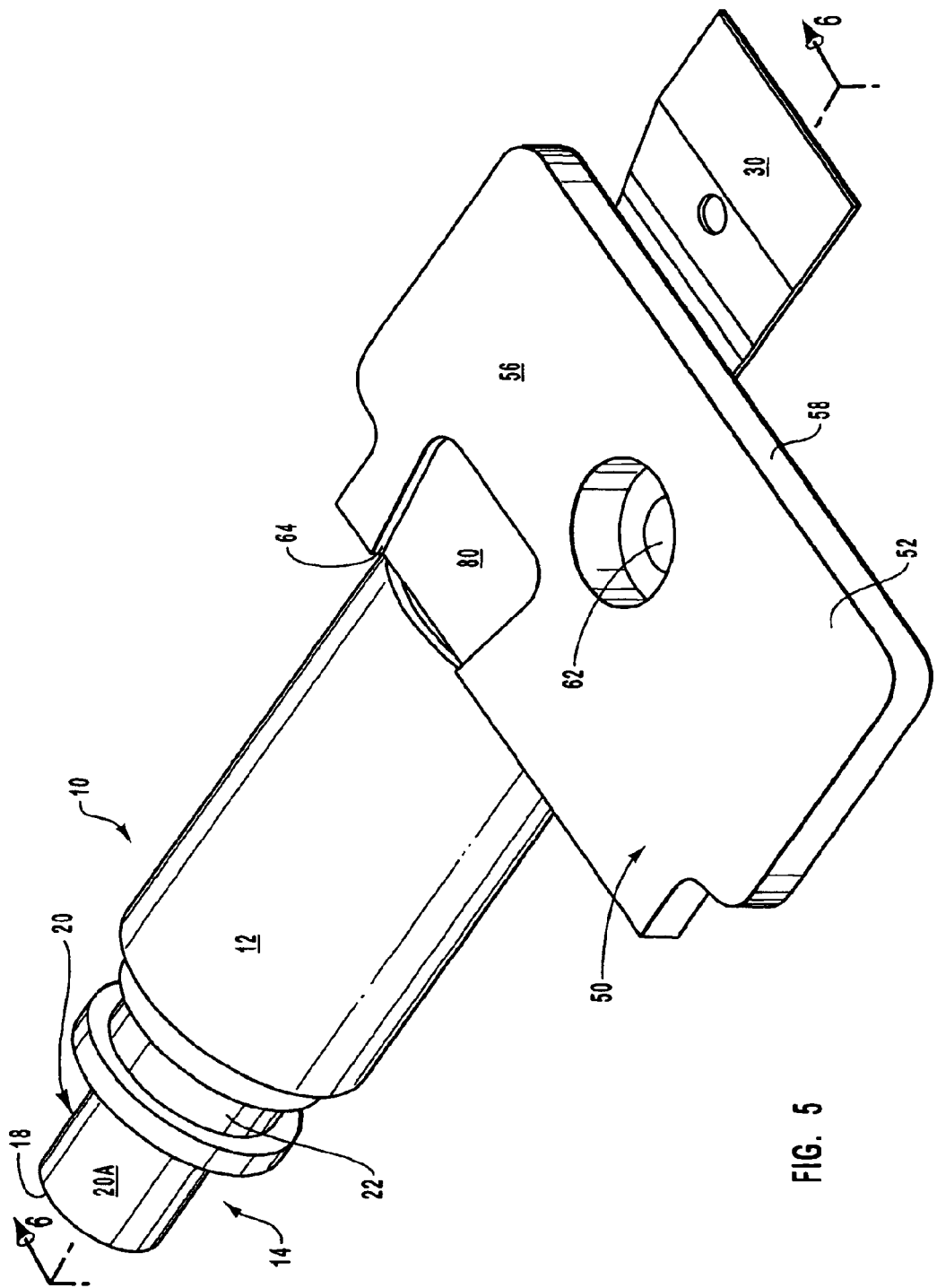
FIG. 5 is a top perspective view of the TOSA and heat spreader of FIG. 4, showing the thermal slug seated within the heat spreader.

Reference is now made to FIGS. 5 and 6, which show various views of the seating of the thermal slug 80 within the cavity 64 of the heat spreader 50. The final seated position of the thermal slug 80 within the cavity 64 is dependent indirectly upon the alignment of the nose assembly 14 with the housing 12, which in turn determines the position of the header assembly 16. As mentioned before, adjustment of the nose assembly 14 with respect to the TOSA housing 12 enables proper alignment to be achieved between optical components located on the interior segment 24A of the component platform 24 and the desired optical path 82 defined through the TOSA 10. Specifically, this alignment procedure enables a laser 84 located on the interior segment 24A to be optimally aligned with the optical path 82 such that optical coupling between the passage 86 and the housing 12 is maximized. Note here that the cap 15 that partially defines the hermetic enclosure 13 includes an optically transmissive window 83 to enable optical signals produced by the laser 84 to pass through the enclosure. As seen in FIG. 6, the desired optical path 82 is defined through the TOSA housing 12 and through the passage 86 defined in the nose assembly 14.

Once alignment of the nose assembly 14 is complete, the nose assembly 14 is laser welded or otherwise affixed to the TOSA housing 12, as described above. The TOSA 10, now comprising the housing 12 having both the header assembly 16 and the nose assembly 14 attached thereto, is then placed within the shell of an optical transceiver (FIGS. 7 and 8). Because the nose assembly 14 includes the connector portion 20, which interfaces with a connectorized fiber optic cable to enable the transmission of optical signals produced by the TOSA 10, it is seated within the transceiver in a position that is identical for each transceiver. Thus, the positioning of the nose assembly 14 with respect to the shell of the optical transceiver is pre-determined and non-variable. As discussed above, however, the position of the nose assembly 14 with respect to the TOSA housing 12 can vary from transceiver to transceiver due to alignment needs. This in turn results in a relative distance between the final position of the heat tongue 26 of the header assembly 16 and the heat spreader 50, this relative distance varying according to the particular transceiver and the alignment of its desired optical path 82.

In light of the above, then, the vertical position of the thermal slug 80 after seating within the cavity 64 is dependent upon the final position of the header assembly 16 as determined by the above alignment procedure. For instance, the nose assembly 14 shown in FIGS. 5 and 6 can be adjusted to a specified aligned positioned with respect to the TOSA housing 12 in order to align the laser 84 with the desired optical path 82 through the TOSA 10. The TOSA 10 is then installed in the transceiver shell with the nose assembly 14 residing in an exact, predetermined location therein. In the manner just described, this places the TOSA housing 12 and the header assembly 16, including the heat tongue 26, relatively close to the bottom surface 54 of the heat spreader 50 (see FIG. 3) compared to its nominal position. The thermal slug 80 compensates for this by seating in the cavity 64 in a relatively more shallow position than normal to physically contact the surface of the heat tongue 26. This shallower seated position of the thermal slug 80 is shown in FIGS. 5 and 6, wherein the slug is shown recessed into cavity 64 only a small distance while in physical contact with both the heat tongue 26 and the heat spreader body 52. In another possible configuration (not illustrated), the header assembly 16 of another transceiver module might need to be adjusted such that the heat tongue 26 is relatively farther away from the bottom surface 54 of the heat spreader 50. Thus, more distance would separate the heat tongue 26 from the heat spreader 50, thus allowing the thermal slug 80 to seat more deeply within the cavity 64 of the heat spreader while still contacting the surface of the heat tongue 26 and the heat spreader body 52. Still other configurations are possible, wherein the thermal slug 80 is positioned at any one of a variety of seated positions within the cavity 64, according to the distance of separation existing between the surface of the heat tongue 26 and the bottom surface 54 of the heat spreader 50 as a result of header assembly alignment.

It is noted that the present invention is configured to compensate not only for vertical displacement of the heat tongue 26 with respect to the heat spreader 50, but horizontal displacement as well. Indeed, in presently preferred embodiments the thermal slug 80 has a width that is at least 0.02 inch greater than the width of the heat tongue 26. In this way, any lateral displacement of the heat tongue (which as described above can result in 0.01 inch displacement in any planar direction) that is encountered as a result of laser alignment with respect to the nose assembly 14, does not affect a full thermal connection being established between the heat tongue and the thermal slug 80. Note that both the heat tongue 26 and the thermal slug 80 include planar surfaces in the region were these two components thermally connect, which enables lateral displacement relative one another to occur. Of course, in other embodiments the relative width relationship between the thermal slug 80 and the heat tongue 26 can vary as needed in accordance with a particular application.

Continuing reference is made to FIGS. 5 and 6 in describing details of the operation of an optical transceiver module having a TOSA configured in accordance with the present invention. Regardless of which of the many possible positional configurations of the header assembly 16 and heat tongue 26 explained above is encountered, the heat spreader 50 of the present invention is configured to reliably and continuously remove heat from the TOSA 10. During operation of the optical transceiver module in which the TOSA 10 is located, the TOSA produces a modulated optical signal suitable for transmission by the transceiver to an optical communications network. Several TOSA components are utilized in this process, including electronic and optical components located on the interior segment 24A of the component platform 24, best seen in FIG. 6. Among these components is the laser 84. In producing the optical signal, the laser 84 also creates a substantial amount of heat. This heat must be continuously removed from the TOSA housing 12 during transceiver operation in order to ensure proper functioning of the TOSA 10. Should the heat instead be allowed to buildup within the TOSA housing, malfunction of one or more TOSA components could occur.

Heat that is produced by the laser 84 and by other components located on the interior segment 24A of the component platform 24 is absorbed by the ceramic material comprising the platform, which in turn is absorbed by the interior portion 26A of the heat tongue 26 which is in thermal communication with the component platform. This heat is conducted by the interior portion 26A of the heat tongue 26 to the exterior portion 26B thereof. The heat present in the heat tongue exterior portion 26B is then transferred to the thermal slug 80 of the heat spreader 50. The thermal transfer occurring between the exterior portion 26B of the heat tongue 26 and the thermal slug 80 occurs in a substantially efficient manner, given the direct physical contact of the slug with the heat tongue regardless of the particular alignment position of the header assembly 16. Heat absorbed by the thermal slug 80 is then readily conducted into the body 52 of the heat spreader 50 through the walls of the body that define the cavity. Given both the close proximity of the thermal slug 80 to the heat spreader body 52 and the relatively large mass of the body (which enables the body to operate as a heat sink), heat is readily transferred from the slug to the body. The heat absorbed by the body 52 of the heat spreader 50 is then dissipated to the housing of the optical transceiver module (FIGS. 7, 8) in a manner to be described below. In this way, heat is reliably removed from the TOSA 10, thereby ensuring proper functioning of both it and the optical transceiver module in general.

Reference is now made to FIG. 7, which shows details regarding the placement of the heat spreader within an optical transceiver module, depicted generally here at 100. As shown, the transceiver 100 includes a shell 102 that defines a cavity in which various transceiver components are placed. In particular, the TOSA 10 is shown positioned in the shell 102 of the transceiver 100, wherein the annular groove 22 of the nose assembly 14 interfaces with features defined in the transceiver housing to securely hold the TOSA in place. In presently preferred embodiments, the shell 102 is composed of die-case zinc.

The header assembly 16, partially obscured from view by the flex circuit 30, is shown extending from the end of the TOSA 10. The flex circuit 30 is, as explained above, electrically connected with the component platform 24 and is positioned to electrically connect with a transceiver printed circuit board yet to be placed in the transceiver shell 102. The heat spreader 50 is shown positioned in the transceiver shell 102 with its bottom surface 54 facing up. A screw 104 is shown passing through the aperture 62 of the heat spreader body 52 to at least partially secure the heat spreader 50 to the shell 102. In this configuration, the screw boss 72 is positioned to maintain an adequate spacing between the heat spreader 50 and the transceiver printed circuit board that is to be included in the shell 102, while at the same time ensuring that adequate pressure is applied to the heat spreader via the screw 104. The screw boss 72 can also help properly align the heat spreader 50 within the shell 102 when the screw 104 is received into the screw boss.

The thermal slug 80 of the heat spreader 50 is shown in position within the cavity 64 of the body 52. As desired, and regardless of the particular final position of the header assembly 16 within the transceiver shell 102, the thermal slug 80 ensures that an adequate thermal path is established between the heat tongue 26 of the header assembly and the heat spreader body 52. As briefly mentioned, the heat spreader body 52 is also thermally connected with the transceiver shell 102. This can be accomplished a variety of ways, but in the present embodiment, a thermally conductive polymer 105 (shown in phantom) is placed between the top surface 56 (FIG. 2) of the heat spreader body 52 and the adjacent portion of the transceiver shell 102. The screw 104 can be used to ensure that good contact is established by the polymer 105 between the heat spreader 50 and the transceiver shell 102. The conductive polymer 105 ensures that a good thermal connection is established between the shell 102 and the top surface 56 of the body 52 such that the heat absorbed by the heat spreader body 52 from the thermal slug 80 is efficiently passed to the housing. (Though not occurring here, the heat spreader 50 could be configured such that heat is also passed from the heat spreader body 52 to the shell 102 through the outer periphery 58 of the body 52 as well. Alternatively, direct heat spreader-to-transceiver shell contact alone can be employed in transferring heat between the two components. Finally, once received by the transceiver shell 102, the heat can be dissipated from the housing in a variety of ways, including convective air cooling.

Reference is made to FIG. 8, which shows the transceiver 100 of FIG. 7 with a transceiver printed circuit board ("TPCB") 106 positioned in the shell 102 thereof. As shown, the TPCB 106, which includes electronic components such as a laser driver and post-amplifier for controlling transceiver operation, is positioned within the shell 102 such that electrical connection is made to the flex circuit 30 and to other flex circuits shown in the figure. A portion of the TPCB 106 is positioned atop the heat spreader 50. The screw 104 (which secures the heat spreader body 52 via the aperture 62) is shown penetrating the TPCB 106 to secure it within the shell 102. Again, the screw boss 72 (FIG. 7) of the heat spreader 50 ensures that adequate spacing exists between the heat spreader body 52 and the TPCB 106. Though not shown, a housing cover can be placed on the shell 102 to cover the illustrated components.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A heat transfer system for use in removing heat from an optical subassembly located in a shell of an optical transceiver module, the optical subassembly including a housing, the heat transfer system comprising:
    a heat tongue attached to the optical subassembly to include an interior portion located within the housing and an exterior portion located outside of the housing, the heat tongue being capable of absorbing heat from within the housing;
    a heat spreading device having a body made from a thermally conductive material, the body being sized to be received within and in thermal communication with the shell of the optical transceiver module;
    a cavity at least partially defined through the body, the cavity being positioned substantially adjacent the heat tongue; and
    a thermally conductive slug received within the cavity of the body, the slug being positioned within the cavity to absorb heat from the heat tongue and transfer it to the body of the heat spreading device.

2. A heat transfer system as defined in claim 1, wherein the slug is capable of being initially placed in a variety of positions within the cavity to be capable of absorbing heat from the heat tongue and transferring the heat to the heat spreading device.

3. A heat transfer system as defined in claim 1, wherein the slug is affixed to at least one of the heat tongue and the body of the heat spreading device.

4. A heat transfer system as defined in claim 1, wherein the housing comprises a hermetic enclosure.

5. A heat transfer system as defined in claim 1, wherein the optical subassembly is a transmitter optical subassembly ("TOSA").

6. A heat transfer system as defined in claim 5, wherein the heat tongue is thermally connected to at least one component located within the TOSA.

7. A heat transfer system as defined in claim 6, wherein the at least one component is positioned on a component platform that is at least partially located within the TOSA, and wherein the heat tongue is affixed to a portion of the component platform.

8. A heat transfer system as defined in claim 6, wherein the at least one component is a laser.

9. A heat transfer system as defined in claim 1, wherein the cavity is defined completely through the body of the heat spreading device.

10. A heat transfer system as defined in claim 1, wherein the heat spreading device is capable of transferring heat received from the thermal slug to the shell of the optical transceiver module.

11. A heat transfer system for use in removing heat from within a transmitter optical subassembly ("TOSA"), the TOSA being located within a shell of an optical transceiver module, the heat spreader system comprising:
    a header assembly defining a hermetic enclosure;
    a thermally conductive tongue having a portion located within the hermetic enclosure, the tongue capable of transferring heat produced within the hermetic enclosure to a portion of the tongue that is located outside of the hermetic enclosure;
    a thermally conductive heat spreader having a body in thermal communication with the transceiver shell, the heat spreader including a cavity defined through the body, the cavity being at least partially aligned with the tongue; and a thermally conductive slug shaped to be received within the cavity of the heat spreader, the position of the slug within the cavity being adjustable before the slug is affixed to the body such that the slug is capable of physically engaging both a surface of the heat spreader body and a surface of the tongue, wherein heat present in the tongue can be transferred to the body.

12. A heat transfer system as defined in claim 11, wherein the slug is affixed to the heat spreader body and the tongue.

13. A heat transfer system as defined in claim 12, wherein a silver epoxy or a solder is used to affix the slug to the heat spreader body and the tongue.

14. A heat transfer system as defined in claim 11, wherein a thermally conductive polymer is placed between the heat spreader body and the shell of the optical transceiver module to enhance heat transfer between the body and the shell.

15. A heat transfer system as defined in claim 11, further comprising a component platform positioned at least partially within the header assembly, the component platform having at least one component positioned thereon, wherein the component platform is attached to the tongue such that heat that is produced by the at least one component is transferred via the component platform to the tongue.

16. A heat transfer system as defined in claim 15, wherein the at least one component is a laser.

17. A heat transfer system as defined in claim 15, wherein the portions of the component platform and tongue that are positioned within the hermetic enclosure are attached together.

18. A heat transfer system as defined in claim 11, wherein the shape of the cavity and the slug is substantially trapezoidal.

19. A heat transfer system as defined in claim 11, wherein the heat spreader body comprises a planar slab substantially composed of copper.

20. A heat transfer system as defined in claim 19, wherein the slug is substantially composed of copper.

21. A method of assembling an optical transceiver module, comprising the acts of:
   in a transmitter optical subassembly ("TOSA"), aligning a nose assembly with a laser located on a component platform positioned within the TOSA such that at least some of the optical signals to be produced by the laser can be emitted from the TOSA via the nose assembly;
   securing the TOSA within a shell of the optical transceiver module;
   securing a thermally conductive heat spreader within the shell such that a cavity formed in the heat spreader is positioned at least partially over a heat tongue connected to the TOSA, the heat tongue capable of receiving heat from the component platform, at least some of the heat having been produced by the laser and conducted to the component platform; and
   placing a thermal slug in the cavity of the heat spreader and positioning it such that the thermal slug physically contacts both the heat tongue and the heat spreader, the thermal slug being capable of receiving heat from the tongue and transferring at least some of the heat to the heat spreader.

22. A method of assembling as defined in claim 21, further comprising the act of:
   affixing the slug to the heat spreader and to the heat tongue.

23. A method of assembling as defined in claim 21, further comprising the act of:
   interposing a thermally conductive polymer material between the heat spreader and the shell of the optical transceiver module to facilitate the transfer of heat from the heat spreader to the shell.

24. An optical transceiver module for use in optical communications, comprising:
   a transceiver shell containing a transmitter optical subassembly ("TOSA"), the TOSA defining a hermetic enclosure and including:
      a component platform attached to the TOSA, the component platform having an interior portion located within the hermetic enclosure on which a laser is located and an exterior portion located outside of the hermetic enclosure;
      a heat tongue attached to the component platform to define an interior portion located within the hermetic enclosure and an exterior portion located outside of the hermetic enclosure, the interior portion of the heat tongue being capable of absorbing heat from the component platform and transferring the heat of the exterior portion of the heat tongue; and
   a heat spreading device positioned in the transceiver shell, the heat spreading device comprising:
      a thermally conductive body having a cavity defined through the body, the body being positioned within the shell such that the cavity is substantially adjacent the exterior portion of the heat tongue; and
      a thermally conductive slug sized and configured to be received in the cavity, wherein the slug is in thermal communication with both the exterior portion of the heat tongue and the body such that heat from the component platform that is absorbed by the heat tongue is conducted to the body of the heat spreading device.

25. An optical transceiver module as defined in claim 24, wherein the slug and the cavity are correspondingly shaped with respect to one another.

26. An optical transceiver module as defined in claim 25, further comprising a flex circuit that is attached to the exterior portion of the component platform.

27. An optical transceiver module as defined in claim 26, wherein the slug is attached to both the exterior portion of the heat tongue and the body of the heat spreading device.

28. An optical transceiver module as defined in claim 27, wherein the heat tongue is comprised of a tungsten copper alloy, and wherein the component platform is comprised of a ceramic material.

29. An optical transceiver module as defined in claim 28, wherein at least one component comprising the TOSA is aligned with an optical path defined through the TOSA before the slug is received by the cavity of the heat spreading device body.

30. An optical transceiver module as defined in claim 29, further comprising a conductive polymer interposed between the heat spreading device and the shell, the conductive polymer assisting with the transfer of heat from the thermally conductive body to the shell.

31. An optical transceiver module as defined in claim 30, wherein the body of the heat spreading device defines a raised structure about the hole defined in the body, the raised structure configured to ensure adequate spacing exists between the heat spreading device and a printed circuit board positioned in the shell of the optical transceiver module.

32. An optical transceiver module as defined in claim 31, further comprising a hole defined in the body of the heat spreading device for receiving a screw that is configured to attach the body to the shell of the optical transceiver housing.

* * * * *